(12) United States Patent
Meiller et al.

(10) Patent No.: US 7,168,765 B2
(45) Date of Patent: Jan. 30, 2007

(54) VEHICLE SEAT

(75) Inventors: Hermann Meiller, Wernberg-Köblitz (DE); Richard Ott, Kümmersbruck (DE)

(73) Assignee: Grammar AG, Amberg (DE)

( * ) Notice: Subject to any disclaimer, the term of this patent is extended or adjusted under 35 U.S.C. 154(b) by 0 days.

(21) Appl. No.: 10/957,420

(22) Filed: Oct. 1, 2004

(65) Prior Publication Data
US 2005/0099050 A1    May 12, 2005

(30) Foreign Application Priority Data
Oct. 16, 2003  (DE) ................ 103 48 720
Sep. 2, 2004   (DE) ............ 10 2004 042 916

(51) Int. Cl.
*A47C 7/36* (2006.01)

(52) U.S. Cl. ................... 297/396; 297/452.34

(58) Field of Classification Search ............. 297/391, 297/396, 452.36, 452.33, 452.34, 452.35, 297/452.25
See application file for complete search history.

(56) References Cited

U.S. PATENT DOCUMENTS

| | | | | |
|---|---|---|---|---|
| 3,017,221 A | * | 1/1962 | Emery | 297/397 |
| D198,449 S | * | 6/1964 | Kerr | D6/601 |
| 3,283,344 A | * | 11/1966 | Blanchard | 5/639 |
| 3,578,383 A | * | 5/1971 | Earl | 297/391 |
| 4,285,081 A | * | 8/1981 | Price | 297/391 |
| 4,300,249 A | * | 11/1981 | Taylor | 297/452.36 X |
| 4,631,766 A | * | 12/1986 | Semmler et al. | 5/655 |
| 4,883,243 A | | 11/1989 | Herndon | |
| D306,245 S | * | 2/1990 | Akhtarekhavari | D6/601 |
| 5,356,202 A | * | 10/1994 | Itoh | 297/391 |
| 5,505,523 A | * | 4/1996 | Wang | 297/393 |
| 6,250,716 B1 | * | 6/2001 | Clough | 297/391 |
| 6,273,509 B1 | * | 8/2001 | Reithmeier et al. | 297/391 |
| 6,626,494 B2 | * | 9/2003 | Yoo | 297/391 |

FOREIGN PATENT DOCUMENTS

JP        03267014 A  *  11/1991
JP        04279109 A  *  10/1992

* cited by examiner

*Primary Examiner*—Anthony D. Barfield
(74) *Attorney, Agent, or Firm*—Andrew Wilford

(57) ABSTRACT

A seat for a person has a seat part adapted to be fixed in a vehicle and having an upper seating surface on which the person sits, and a seat back extending upward from a rear edge of the seating surface and having a front surface adapted to be leaned against by the person in the seat, facing forward in a vehicle travel direction, and extending upward to an upper region that is upholstered and on a level to engage the head of the person in the seat. The upper region of the seat back is formed with a hollow having a forwardly directed rear surface and a pair of flanking side surfaces extending forward in the direction from outer edges of the rear surface. The side surfaces are horizontally spaced transverse to the direction so as to spacedly flank the head of the person in the seat.

5 Claims, 4 Drawing Sheets

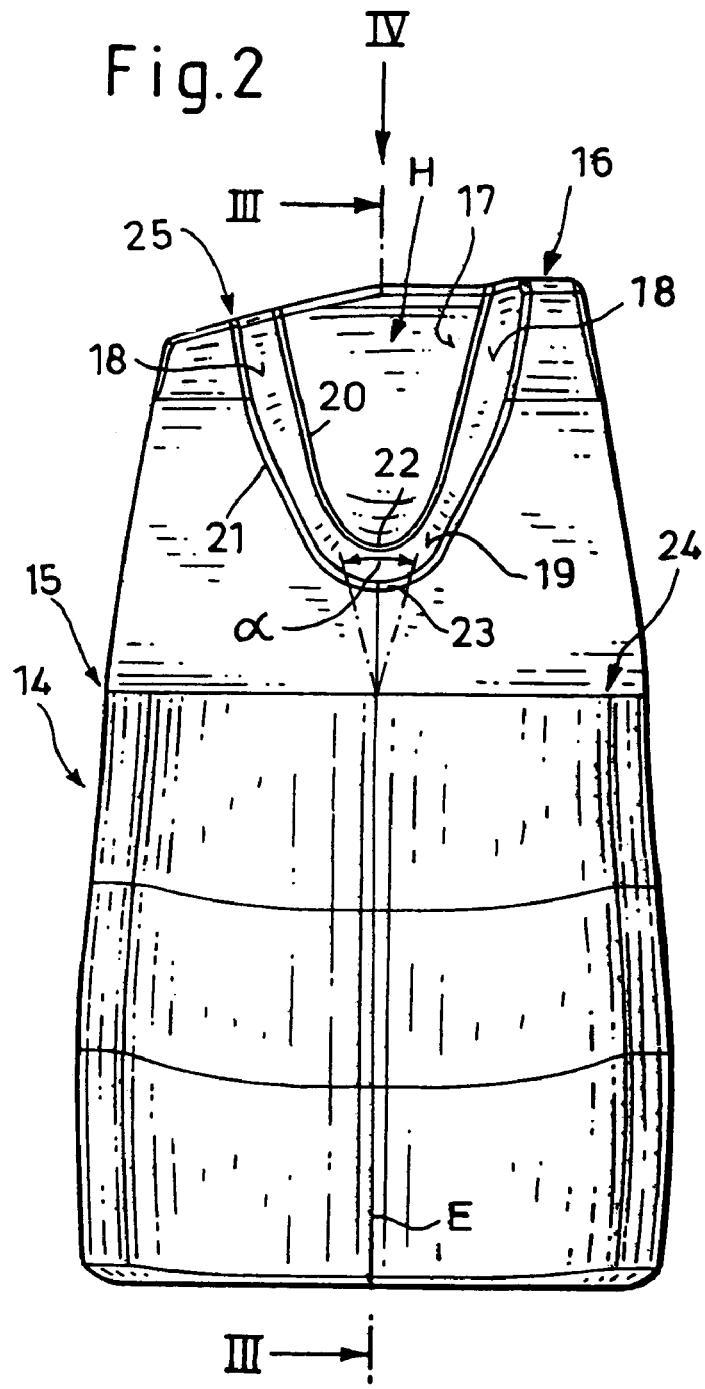
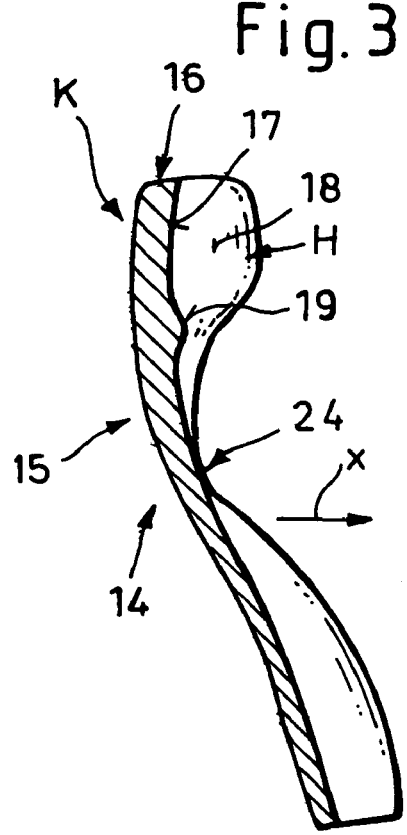

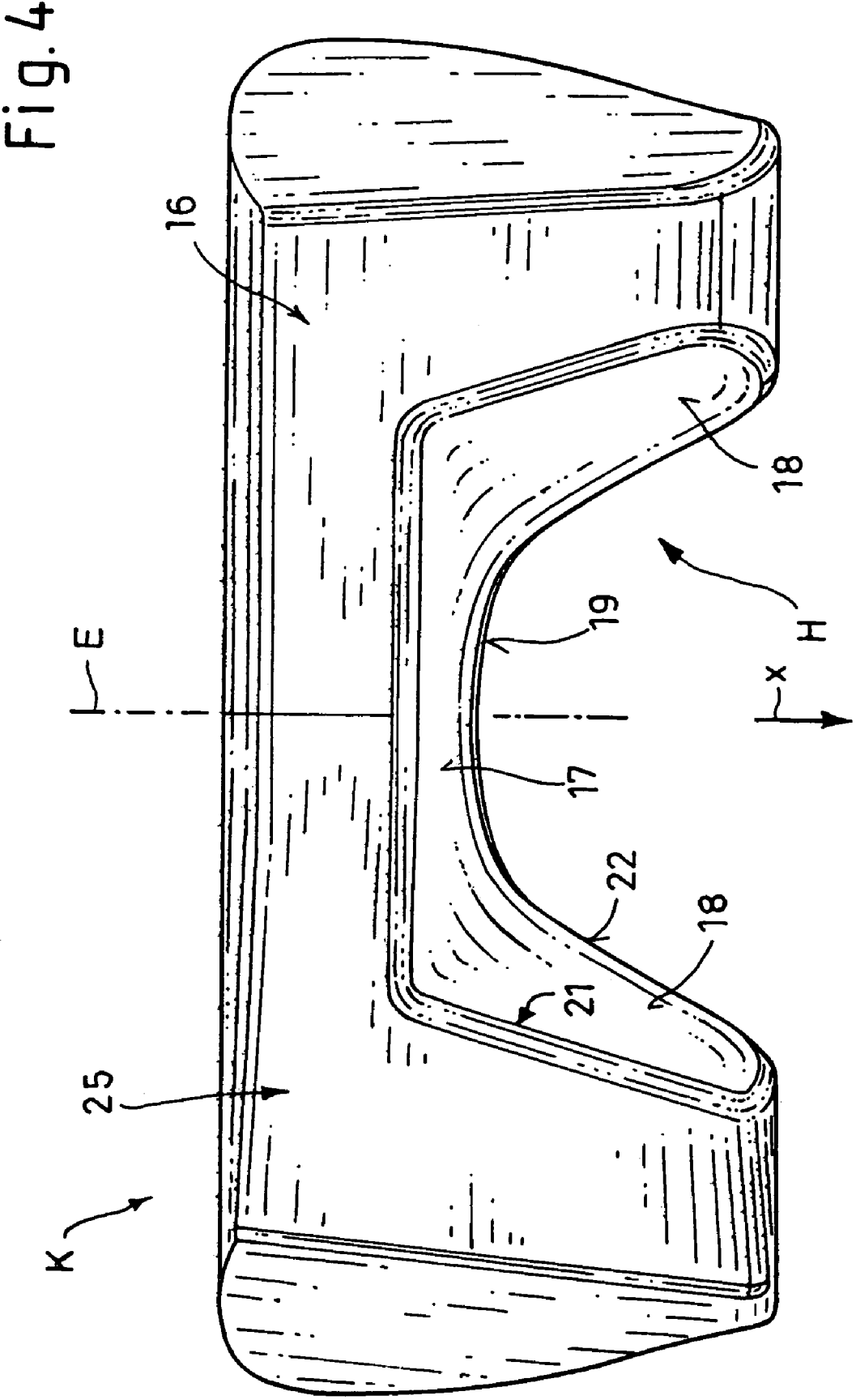

VEHICLE SEAT

FIELD OF THE INVENTION

The present invention relates to a seat. More particularly this invention concerns a seat usable for a passenger of a motor vehicle.

BACKGROUND OF THE INVENTION

A motor-vehicle seat, for example usable in a bus, has a seat part with a generally horizontal sitting surface and a back part extending upward from a rear end of the sitting surface and forming a back-support surface directed forward in a normal vehicle travel direction. Normally the upper portion of the back is provided with or forms a headrest having a front surface that the user can rest his or her head against and that acts as a rearward restraint in an accident. This headrest is often vertically shiftable and/or tippable about a horizontal axis to accommodate users of different height.

U.S. Pat. No. 4,883,243 of Herndon describes an ejection seat for an airplane whose back part has an upper end that forms a headrest as described above. The front surface of this headrest, however, can slide or pivot backward in an emergency so as to greatly increase the front-to-back depth of a cavity of the headrest and cradle the user's head during a forceful ejection procedure. Such a seat is basically unrelated to a seat used in, for instance, a bus.

OBJECTS OF THE INVENTION

It is therefore an object of the present invention to provide an improved seat having a headrest.

Another object is the provision of such an improved seat having a headrest that overcomes the above-given disadvantages, in particular that supports the users head in a particularly safe and comfortable manner.

SUMMARY OF THE INVENTION

A vehicle seat for a person has a seat part adapted to be fixed in the vehicle and having an upper seating surface on which the person sits, and a seat back extending upward from a rear edge of the seating surface and having a front surface adapted to be leaned against by the person in the seat, facing forward in a vehicle travel direction, and extending upward to an upper region that is upholstered and on a level to engage the head of the person in the seat. The upper region of the seat back is formed with a hollow having a forwardly directed rear surface and a pair of flanking side surfaces extending forward in the direction from outer edges of the rear surface. The side surfaces are horizontally spaced transverse to the direction so as to spacedly flank the head of the person in the seat.

The side surfaces diverge forward in the direction and s upward at an acute angle to each other. Thus they can cradle the head of the person in the seat when he or she is sleeping or in an accident, but do not restrict this person's movements significantly.

The upper region of the set back also has an upwardly directed transverse surface defining a floor of the hollow and having outer ends merging with lower ends of the side surfaces. This transverse surface is angled forwardly down from a lower edge of the rear surface. The transverse surface and side surfaces form an upwardly open parabola or an upwardly flaring trapezoid.

The front surface of the seat back according to the invention is concave forward in the direction. The seat back can have an upper edge that is horizontal or that extends at a small acute angle to the horizontal.

BRIEF DESCRIPTION OF THE DRAWING

The above and other objects, features, and advantages will become more readily apparent from the following description, reference being made to the accompanying drawing in which:

FIG. 2 is a front view in the direction of arrow II of FIG. 1;

FIG. 3 is a vertical section taken along line III—III of FIG. 1;

FIG. 4 is a large-scale top view taken in the direction of arrow IV of FIG. 1.

SPECIFIC DESCRIPTION

Figure 1:
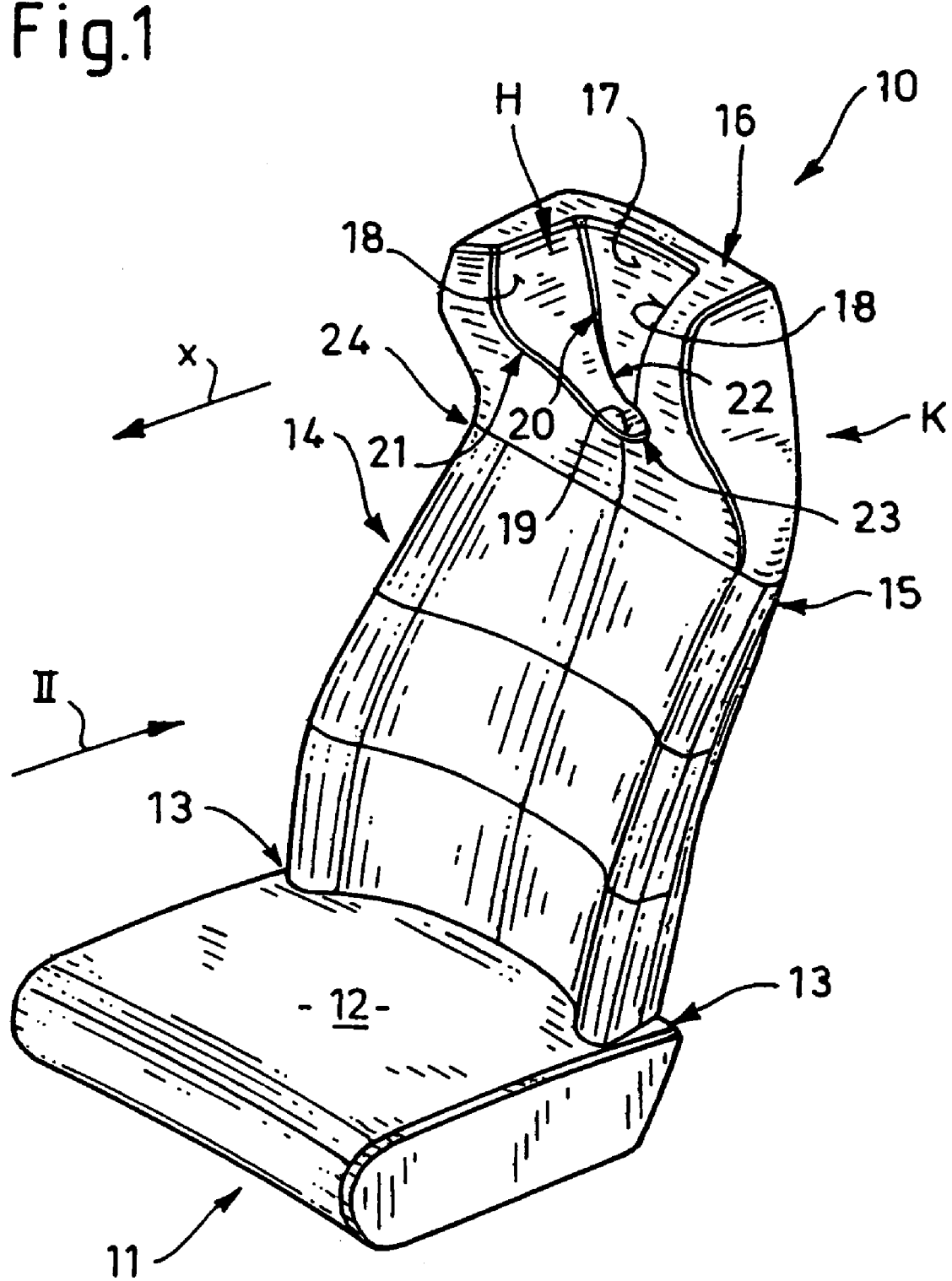
FIG. 1 is a perspective view of a seat according to the invention.

As seen in FIG. 1 a seat 10 for a bus passenger has a seat part 11 forming a generally horizontal sitting surface 12 having a rear edge 13 from which extends a back part 14 having an upper region 15 forming a headrest K. This headrest K forms a cavity or hollow H open forward in a normal vehicle travel direction x and extending upward to a horizontal upper edge 16 of the back part 14. This hollow H is dimensioned so that an average person's head fits in it with quite a bit of space to both sides.

A floor or rear surface 17 of the hollow H is extended forward by a pair of side or flank surfaces 18. These surfaces 17 and 18 are all upholstered. In an accident, for instance a rear-ending, the surface 17 will offer substantial whiplash protection by preventing over extension toward the rear of the passenger's neck. The side surfaces 18 maintain the passenger's head generally centered in the seat 10 but, because of the spacing between them, they do not produce a feeling of claustrophobia by excessively closing in the passenger.

Figure 5:
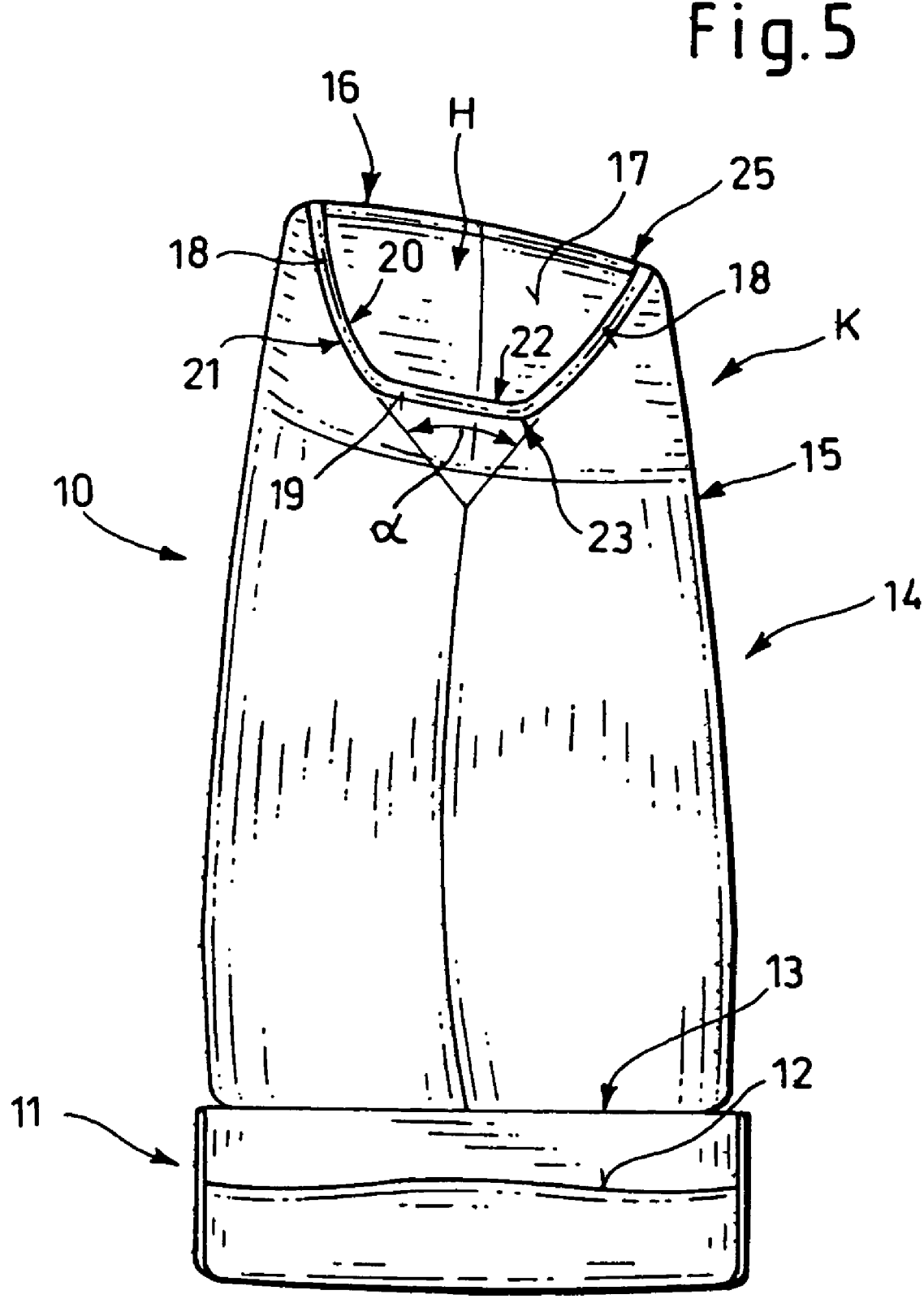
FIG. 5 is a view like FIG. 2 of an alternative seat in accordance with the invention.

The two side surfaces 18 are joined together at their lower end by a transverse surface 19 and the two side surfaces 18 diverge upward, forming with the surface 19 an upwardly open parabola, and have rear and front edges 20 and 21 diverging at an acute angle α as shown in FIGS. 2 and 5. These edges 20 and 21 merge with front and rear edges 22 and 23 of the transverse surface 19 and in fact the surfaces 18 and 19 are formed by a single piece of upholstery. Below this surface 19 the seat back 14 has a front surface 24 that curves backward away from the edge 23 and then outward, giving it a shape that is concave forward in the travel direction x so as to fit comfortably with the passenger's back.

The advantage of the downward convergence of the side surfaces 18 is that, when a passenger chooses to sleep, he or she normally slips downward somewhat in the seat 10. In this case the side surfaces 18 will cradle the passenger's head but due to the shallower depth of the hollow H in its lower region, this will not feel claustrophobic or constricting.

FIG. 5 shows how an upper edge 25 of the back part 14 extends at a small acute angle to the horizontal so that the seat 10 is not symmetrical to a vertical central symmetry plane E (FIGS. 2 and 4) like the seat of FIGS. 1–4. The angled upper edge 25 makes it possible, when the seats 10 are set in a row, to see over the seat in front. Also, in FIG. 5 the hollow H has the shape of an upwardly flaring trapezoid, as compared to the upwardly open parabola of the hollow H of FIGS. 1–4.

We claim:

1. A vehicle seat for a person, which comprises:
   a seat part adapted to be fixed in the vehicle and having an upper seating surface on which the person sits; and
   a seat back having a generally horizontal upper edge, extending upward from a rear edge of the seating surface, and having a front surface adapted to be leaned against by the person in the seat, facing forward in a vehicle travel direction, and extending upward to an upper region that is upholstered and on a level to engage the head of the person in the seat, the upper region of the seat back being formed with a hollow having a forwardly directed rear surface and a pair of flanking side surfaces extending and diverging forward in the direction from outer edges of the rear surface, the side surfaces being horizontally spaced transverse to the direction so as to spacedly flank the head of the person in the seat, the side surfaces diverging upward at an acute angle to each other, the upper region having an upwardly directed transverse surface that defines a floor of the hollow, that has outer ends merging with lower ends of the side surfaces, and that is angled forwardly down from a lower edge of the rear surface, the front surface of the seat back being concave forward in the direction.

2. The vehicle seat defined in claim 1 wherein the transverse surface and side surfaces form an upwardly open parabola.

3. The vehicle seat defined in claim 1 wherein the transverse surface and side surfaces form an upwardly flaring trapezoid.

4. The vehicle seat defined in claim 1 wherein the seat back has a horizontal upper edge.

5. The vehicle seat defined in claim 1 wherein the seat back has an upper edge that extends at a small acute angle to the horizontal.

* * * * *

UNITED STATES PATENT AND TRADEMARK OFFICE
CERTIFICATE OF CORRECTION

PATENT NO.       : 7,168,765 B2
APPLICATION NO.  : 10/957420
DATED            : January 30, 2007
INVENTOR(S)      : Hermann Meiller et al.

It is certified that error appears in the above-identified patent and that said Letters Patent is hereby corrected as shown below:

On the title page item [73]:

Assignee Name should read   GRAMMER AG

Signed and Sealed this

Twenty-seventh Day of March, 2007

JON W. DUDAS
*Director of the United States Patent and Trademark Office*